United States Patent
Cheatle et al.

(10) Patent No.: US 7,365,793 B2
(45) Date of Patent: Apr. 29, 2008

(54) IMAGE CAPTURE SYSTEM AND METHOD

(75) Inventors: Stephen Philip Cheatle, Bristol (GB);
Guy de Warrenne Bruce Adams,
Gloucestershire (GB); Gary Porter,
Weston-super-Mare (GB); David Arthur Grosvenor, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 10/697,640

(22) Filed: Oct. 31, 2003

(65) Prior Publication Data

US 2004/0155968 A1     Aug. 12, 2004

(30) Foreign Application Priority Data

Oct. 31, 2002   (GB)   ................... 0225415.9

(51) Int. Cl.
*H04N 5/225*   (2006.01)
(52) U.S. Cl. .................................... 348/373
(58) Field of Classification Search .......... 348/78, 348/208.14, 376, 158, 169, 373, 53, 47, 115; 396/51; 345/8, 7
See application file for complete search history.

(56) References Cited

U.S. PATENT DOCUMENTS

| | | | | |
|---|---|---|---|---|
| 3,542,457 A | * | 11/1970 | Ziegler et al. | 351/206 |
| 4,516,157 A | * | 5/1985 | Campbell | 348/158 |
| 5,610,678 A | * | 3/1997 | Tsuboi et al. | 396/373 |
| 5,734,421 A | * | 3/1998 | Maguire, Jr. | 348/121 |
| 5,886,739 A | * | 3/1999 | Winningstad | 348/158 |
| 6,141,034 A | * | 10/2000 | McCutchen | 348/36 |
| 6,215,461 B1 | * | 4/2001 | Ishibashi et al. | 345/8 |
| 6,307,526 B1 | * | 10/2001 | Mann | 345/8 |
| 6,307,589 B1 | * | 10/2001 | Maquire, Jr. | 348/333.03 |
| 6,356,296 B1 | * | 3/2002 | Driscoll, Jr. et al. | 348/36 |
| 6,549,231 B1 | * | 4/2003 | Matsui | 348/61 |
| 6,580,448 B1 | * | 6/2003 | Stuttler | 348/46 |
| 6,657,673 B2 | * | 12/2003 | Ishikawa | 348/376 |
| 7,030,909 B2 | * | 4/2006 | Grosvenor et al. | 348/207.99 |

FOREIGN PATENT DOCUMENTS

WO   WO 99/49656   *   9/1999

OTHER PUBLICATIONS

Mayol et al., "Wearable Visual Robots", Oct. 2000, pp. 95-102, IEEE International Symposium on Wearable Computing, ISWC'00, Atlanta.*

* cited by examiner

*Primary Examiner*—James M. Hannett

(57) ABSTRACT

An image viewed by a person is recorded in response to the pointing direction of the eyes of the person by using an optical sensor arrangement that simultaneously derives image segments corresponding with images seen by the person looking forward of his head and to both sides of his head. Alternatively, the sensor arrangement includes plural optical sensors for these images. One image of the plural sensors is selected for recording based on rotation of the head.

31 Claims, 5 Drawing Sheets

IMAGE CAPTURE SYSTEM AND METHOD

FIELD OF INVENTION

The present invention relates to an image capture system and method.

BACKGROUND ART

It is known for a user to wear a head mounted camera, which points in the same direction as the facing direction of the face of a user, i.e., wearer of the camera, so that the camera captures images that are approximately the same as the images in the field of view of the user.

This type of set-up does not take into consideration the user moving his eyes relative to his head, so that the resultant images are often poorly framed.

Head-mounted cameras are well known, such as that described in WO9949656 (Mann). The system described in Mann assumes that the head direction is the correct direction for image capture. Any control of the image that is captured needs to be done by the user consciously pointing his head in the direction of interest. Sophisticated wearable camera systems such as described by Mann, are coupled with a wearable view finder to provide the wearer with confirmation that what the camera is seeing is what is required.

In Wearable Visual Robots (IEEE International Symposium on Wearable Computing, ISWC'00, Atlanta, October 2000) a wearable visual robot is disclosed having a camera carrying pan/tilt mechanism mounted on a wearer's shoulder. The mechanism has motion sensors attached to it, but there are no sensors attached to the wearer's head, so the device is unable to take into account the motion of the wearer's head relative to the body of the wearer. The aim of the approach in this document is to provide a sensor which "decouples camera movement from the wearer's posture and movements." The aim is to allow the robot to choose what to look at. The motion sensors increase the ability of the camera to stabilise its line of vision on the image the robot decides should be captured, regardless of where the user's attention is focused.

Several other arrangements have also been proposed for capturing a panoramic image of a scene. The other arrangements include U.S. Pat. No. 6,141,034 which discloses a dodecahedral arrangement of sensors whose images can be combined into a single panoramic image. Also, U.S. Pat. No. 6,356,296 discloses a parabolic reflector to capture an entire 180° angle of view using a single sensor. The aim of both of these systems is to provide an image having a very wide angle field of view. A problem arising with panoramic view capture is that it is not clear what part of the image is of interest. Typically the entire panoramic view is not of interest, but merely a part thereof.

SUMMARY OF THE INVENTION

According to a first aspect of the invention an apparatus for controlling recording of an image of a scene viewed by a person comprises an optical sensor arrangement for simultaneously deriving image segments corresponding with images of a scene seen by the person looking (a) forward of his head and (b) to at least one side of his head. A detector arrangement controls which of the image segments is to be recorded dependent on an estimate of the pointing direction of the eyes of the person.

Preferably, the optical sensor arrangement is arranged for simultaneously deriving image segments corresponding with images of scenes seen by the person simultaneously looking to both sides of his head.

At least a portion of the optical sensor arrangement is preferably adapted to be worn by the person and to turn with turning of the head of the person.

In some embodiments, the optical sensor arrangement includes plural separate sensors having different fields of view corresponding approximately with scenes the person sees looking forward and to one or both sides of his head.

In a first arrangement, the optical sensor arrangement includes an optical sensor and a reflector arrangement adapted to be turned in response to the control of the detector arrangement.

In a second arrangement, the optical sensor arrangement includes (a) a wide-angle lens having a field of view corresponding with scenes the person sees looking forward of his head and to both sides of his head, and (b) a processor arrangement for selecting only a portion of the wide angle lens field of view in response to the control of the detector arrangement.

Preferably, a buffer memory selectively stores plural sequential images from the simultaneously derived image segments corresponding with images of scenes seen by the person looking forward of his head and to at least one side of his head. The buffer memory responds to the detector arrangement for changing which of the stored plural sequential images in the buffer memory are transferred to the recorder immediately prior to and subsequent to the head of the person turning, as determined by the detector arrangement.

Preferably, the detector arrangement includes a detector for rotation of the head of the person and a processor arrangement coupled with the rotation detector for causing a detected image of the optical sensor arrangement to rotate through a greater angle than the rotation of the head of the person.

Another aspect of the invention relates to apparatus for controlling recording of an image of a scene viewed by a person comprising an optical sensor arrangement including plural optical sensors for images corresponding with images of scenes seen by the person looking forward of his head and to at least one side of his head. A detector arrangement, including a sensor for the rotation of the head of the person, controls which of the images is to be recorded.

In some embodiments, the plural optical sensors have different fields of view and are arranged for simultaneously deriving the images corresponding with the images of scenes seen by the person looking forward of his head and to one or both sides his head.

In one embodiment, the optical sensor arrangement includes first and second turnable reflectors, and the plural optical sensors include first and second separate optical sensors respectively associated with the first and second turnable reflectors. The optical sensor arrangement responds to the detector arrangement and the reflectors are turned so that (a) at least one of the optical sensors responds, via the reflector associated therewith, to images corresponding with images of scenes seen by the person looking forward of his head, (b) the first optical sensor responds, via the first reflector, to images corresponding with images of scenes seen by the person looking to a first side of his head, and (c) the second optical sensor responds, via the second reflector, to images corresponding with images of scenes seen by the person looking to a second side of his head.

In another embodiment, the optical sensor arrangement includes a turnable reflector and first and second optical sensors. The optical sensor arrangement responds to the detector arrangement and the reflector is turned so that (a) at least one of the optical sensors responds, via the reflector, to images corresponding with images of scenes seen by the person looking forward of his head, (b) the first optical sensor responds, via the reflector, to images corresponding with images of scenes seen by the person looking to a first side of his head, and (c) the second optical sensor responds, via the reflector, to images corresponding with images of a scene seen by the person looking to a second side of his head.

Preferably, the reflector is turned toward one of the optical sensors and the forward facing direction of the head of the person while the head is directed forward.

In an additional embodiment, the optical sensor arrangement includes first and second optical sensors positioned so that they have different fields of view so that (a) the first optical sensor responds to images corresponding with images of scenes seen by the person looking forward of his head, and (b) the second optical sensor responds to images corresponding with images of scenes seen by the person looking to a first side of his head.

In a further embodiment, the optical sensor arrangement includes first, second and third optical sensors positioned so that they have different fields of view so that (a) the first optical sensor responds to images corresponding with images of scenes seen by the person looking forward of his head, (b) the second optical sensor responds to images corresponding with images of scenes seen by the person looking to a first side of his head, and (c) the third optical sensor responds to images of scenes corresponding with images seen by the person looking to a second side of his head.

A further aspect of this invention relates to apparatus for controlling recording of an image viewed by a person comprising an optical sensor arrangement including a wide angle optical sensor from which image segments having different fields of view can be simultaneously derived. The image segments correspond with images of scenes seen by the person looking forward of his head and to at least one side of his head. A detector arrangement, including a sensor for rotation of the head of the person, controls which of the image segments is to be recorded.

Preferably, the wide angle optical sensor derives several image segments corresponding with images of scenes seen by the person looking forward of his head and to both sides of his head.

Preferably, the wide angle optical sensor is adapted to be worn by the person and the detector arrangement includes a processor that controls which of the image segments is to be recorded in response to the sensor for the extent of rotation of the head of the person.

An additional aspect of the invention relates to a method of recording an image of a scene viewed by a person using an optical sensor arrangement that simultaneously derives image segments corresponding with images of scenes seen by the person looking (a) forward of his head and (b) to at least one side of his head. The method comprises the steps of controlling which of the image segments is recorded in response to an approximation of the pointing direction of the eyes of the person.

Preferably, the optical sensor arrangement simultaneously derives image segments corresponding with images of scenes seen by the person simultaneously looking to both sides of his head and the controlling step records one of the images.

In an embodiment wherein the optical sensor arrangement includes a wide-angle lens having a field of view corresponding with the scene seen by the person looking forward of his head and to both sides of this head, the method comprises selecting only a portion of the wide angle lens field of view in response to the control of the detector arrangement.

Preferably, selectively plural sequential images from the simultaneously derived image segments corresponding with images of scenes seen by the person looking forward of his head and to at least one side of his head are stored. The stored plural sequential images that are transferred to the recorder are changed immediately prior to and subsequent to the head of the person turning.

Preferably the detected image of the optical sensor arrangement rotates through a greater angle than the rotation of the head of the person in response to the detected head rotation.

Yet another aspect of the invention relates to a method of recording an image of a scene viewed by a person by using an optical sensor arrangement including plural optical sensors for images corresponding with images of scenes seen by the person looking forward of his head and to at least one side of his head. The method comprises selecting one of the images in response to rotation of the head of the person, and recording the selected image segments. These two steps are also used in an added aspect of the invention wherein an image of a scene viewed by a person using an optical sensor arrangement including a wide angle optical sensor from which image segments having different fields of view can be simultaneously derived wherein the image segments correspond with images of scenes seen by the person looking forward of his head and to at least one side of his head is recorded.

Many of the foregoing aspects of the invention are based on the realization that when a person turns his head to look at a new stimulus his eyes typically move more quickly than his head so that as the person looks to the side his eye movement and head rotation movement, rotate his field of view direction by up to twice the angle of the head rotation alone. If a camera is fixed to the head of a person the camera only rotates through the same angle as the head movement, which results in the camera no longer capturing a field of view that is approximately the same as the field of view of the eyes of the person. Below are described various embodiments for enabling an image sensor to offset the direction of the field of view of an image captured by an image capture device (e.g., a camera) from the direction of a user's head, such that the field of view direction of the image capture device rotates in the same direction as the head, but by a larger angle. This is accomplished by sensing the rotation of the user's head, detecting when a turn to the left or right is occurring and moving the angle of the field of view of the image sensing device so that the field of view rotates farther than the rotation of the head alone, in the same direction as the head rotation.

Many of the described aspects are directed to a system or method that adjusts the direction of image capture to take into account eye motion, rather than simply relying on head direction. This frees a user from having to think about what is being captured, because the wearable camera system generally captures the area of visual attention more accurately than a conventional head mounted camera.

Preferably, a head rotation detection mechanism controls an additional change in the direction of view of the captured image beyond mere movement of the head of the person.

The direction of detected head movement can be used to select an additional or lateral image capture device that provides the field of view.

The above and still further objects, features and advantages of the present invention will become apparent upon consideration of the following detailed description of specific embodiments thereof, especially when taken in conjunction with the accompanying drawings.

BRIEF DESCRIPTION OF THE DRAWINGS

FIG. 1b is a schematic view from above of the person and device shown in FIG. 1a;

FIG. 3b is a schematic top view of apparatus illustrated in FIG. 3a;

FIG. 4b is a schematic diagram to help describe the operation of the apparatus of FIG. 4a wherein a desired field of view is selected from a wide angle image in response to head movement of a person wearing the camera of FIG. 4a.

DETAILED DESCRIPTION OF THE DRAWINGS

Figure 1A:
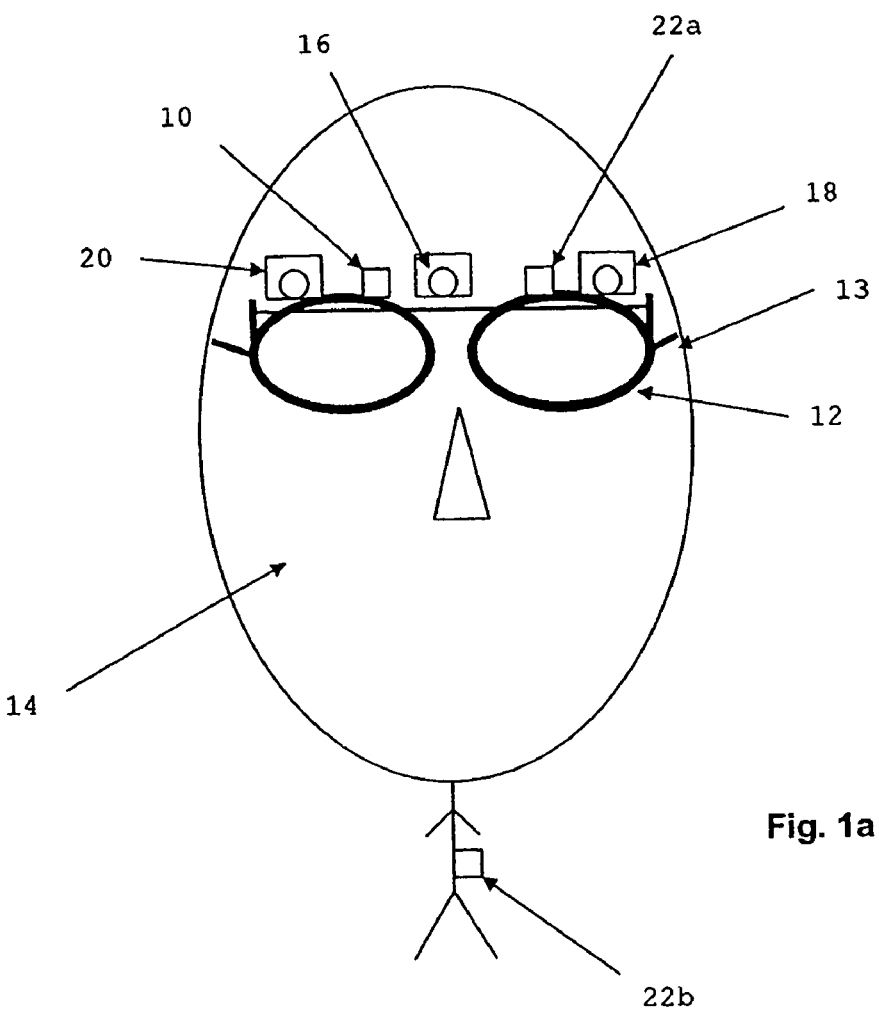
FIG. 1a is a schematic front view of person carrying an image capture device having three separate image sensors pointing at different angles and incorporating a motion sensor, for wear on a pair of spectacles.
Figure 1B:
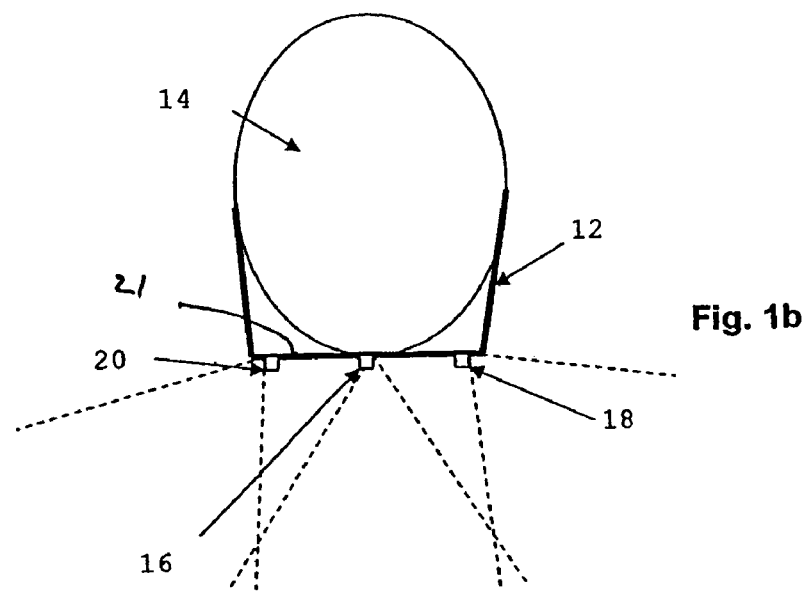

FIGS. 1a and 1b include a structure for detecting head rotation of person 14, in the form of a first head rotation detection mechanism 10 that is mounted on a pair of spectacles 12 worn by the person. The head rotation detection mechanism 10 includes a mechanical motion sensor.

The mechanical sensor included in mechanism 10 is preferably a micro-compass which derives a signal indicative of an absolute measure of the pointing direction of detection mechanism 10. Suitable calibration to a forward direction of mechanism 10 enables mechanism 10 to derive a signal having an amplitude commensurate with an angle of deviation from forward to indicate how much the head of person 14 has turned. A suitable type of compass is a Hall effect cell, which may have an accuracy as low as 45°, that in many instances is sufficient to indicate that a person's head has moved from a forward direction to either right or left. Such a low accuracy device has the benefit of low cost. A more accurate compass is a Honeywell HMR 3200 model, that derives an electric signal having a half degree accuracy.

An alternative type of head rotation detection mechanism device 10 is a miniature gyroscopic device, such as a Murata Enc 03J, a piezoelectric device having a vibrating column that is moved off-axis in response to acceleration of the device. The off-axis movement causes current to flow in a piezoelectric crystal. With a gyroscope, the rate of movement need only be mathematically integrated to indicate an angle through which the accelerator has rotated. The accelerometer type gyroscope derives an output signal having an amplitude indicative of the amount of rotation, as determined by integrating the piezoelectric crystal current.

The output signal of the accelerometer type gyroscope has a peak in a first, e.g. positive, direction for leftward rotation of the head of person 14 and a second, e.g. negative, peak for opposite, rightward direction of the head of person. These peaks provide positive and negative values for an integral of the signal. Thus, left and right motions are easily determined by a positive first peak value for leftward movement and a negative first peak value for rightward movement. The values of the peaks provide the amplitudes of the rotation in that given direction.

Normally, after person 14 turns his head from a forward facing direction, he turns his head back to the forward facing position a short time later. In addition, person 14 typically points his head forward for the majority of time. Both of these facts are used to reset the head rotation detection mechanism 10 which is set to have the forward direction as the direction used for the majority of the time.

An alternative way of detecting head rotation is to analyze high frame rate imagery from video camera 16 (FIG. 1a), mounted on the head of user 14 so the video camera field of view is in line with the forward direction of the head of person 14. Head rotation is detected from the motion field of the video image. Camera 16 captures images at a high frame rate, and movement of the image is detected. For example images can be coded with an MPEG standard, in which the difference between successive different images is calculated and coded, rather than coding the whole image for each "frame". By taking a crude average of the position of selected blocks within an image and analysing how those blocks move across the screen, a sufficiently accurate estimate of head rotation speed can usually be obtained. More specifically, corner points or edges of objects within the field of view captured by camera 16 can be detected and located and then tracked across the field of view to give an estimate of the amount of rotation of the head of person 14. This latter method needs a reasonable degree of focus to detect corner points. Further information can be obtained from Comparing and Evaluating Interest Points; Cornelia Schmid, Roger Mohr, and Christian Bauckhage; INRIA Rhône-Alpes, 655 ar d'L Europe, 28330, Montbonnot, France.

Together with detection of head motion/rotation, it is also necessary to have a controllable field of view for image capture.

A first embodiment, illustrated in FIGS. 1a and 1b, employs several cameras (i.e., devices including an optical image sensor of the type employed in digital cameras and a focusing arrangement) fixedly mounted on spectacles 12. The cameras are angled in different fixed orientations relative to the eyes of person 14. The image that is recorded, i.e., captured, is switched automatically from one camera to another camera. It is also possible to form a view from an intermediate angle of view by forming a composite image from parts of images from an adjacent pair of cameras.

In FIG. 1a and FIG. 1b are shown a central camera 16, a left camera 18, and a right camera 20 having the fields of view shown schematically in FIG. 1b by dashed lines emanating from each camera, such that the field of view of camera 16 extends along a pair of straight lines that diverge from the front face of camera 16 and extend forwardly of line 21 at right angles to the viewing direction of the eyes of person 14, the field of view of camera 18 is to the left side of the face of person 14, along lines diverging from camera 18, at angles slightly less than a right angle to line 21 and slightly forward of line 21, and the field of view of camera 20 is to the right side of the face of person 14, along lines diverging from camera 20, at angles slightly less than a right angle to line 21 and slightly forward of line 21. The peripheral parts of the fields of view of cameras 16 and 18 and of cameras 16 and 20 overlap.

The embodiment shown in FIGS. 1a and 1b is typically used by recording the image derived by central camera 16 when the head of person 14 is not rotating, while the images of the other cameras 18 and 20 are ignored. When rotation of the head of person 16 to the left, for example, is detected by the motion detection device 10, the image recorded is switched to the image derived by camera 18. When device 10 detects the head of person 16 returning to the center position, recording is switched back to the image derived by central camera 16. Similarly, when a right turn of the head is detected recording is switched to the image derived by right camera 20 and back to the central camera 16 when the head of person 14 turns back to the center position.

The pair of spectacles 12 shown in FIGS. 1a and 1b carries cameras 16, 18 and 20 and motion detection device 10. Motion detection device 10 can be located on an arm 13 of the spectacles to be less obtrusive. Also, a control and image recording apparatus 22a can be located on spectacle 12. Alternatively, images can be transmitted to a remote control and image storage section 22b, for example by a wireless link, such as a Blue Tooth link, or by a wired link. Apparatus 22a/b includes a suitable controller and recorder for achieving the foregoing recording and switching functions results. While section 22b is preferably carried on the body of the user, it is to be understood that section 22b can be remote from the user.

Typically, control and image recording apparatus 22a/b responds to cameras 16, 18, 20 and motion detector means 10 to continuously capture the simultaneously derived images from one of cameras 16, 18 and 20. Apparatus 22a/b can be arranged to respond to detector 10 so frames associated with motion are not recorded if the exposure time of such frames cannot be kept sufficiently high to avoid motion blur. The frames can be stored continuously as a video. Alternatively, such frames can be held in a temporary rolling buffer of apparatus 22a or 22b such that a predetermined number of the last few images is recorded. In this case, the user would typically signal to apparatus 22a or 22b when something that should be recorded had just been observed. On receiving the signal, the control/storage apparatus 22a or 22b transfers the current contents of the rolling buffer to its permanent storage, also located in the control/storage section 22a/22b.

Normally, after person 14 turns his head to the side, the person turns his head back to the forward facing position within a short time. Such motion is detected by the head rotation sensor 10 to cause the image capture apparatus 22a/22b to revert the recording operation to the centrally positioned camera 16. If sensor 10 does not detect a return rotation to the central position within a short time, typically approximately 2 seconds, the controller/storage apparatus 22a/b automatically returns to recording the central view from camera 16, because it is unlikely that the person 14 will keep his eyes far from straight for a prolonged time. Instead, person 14 is likely to turn his body towards the direction of interest, causing his eyes to face in the same direction as his body.

This automatic return to center can be achieved by a simple time-out mechanism in apparatus 22a/b. Alternatively, the apparatus 22a/b records the image from central camera 16 when apparatus 22a/b has a high confidence that an image of acceptable quality has been captured by camera 18 or 20, looking in an extreme direction, i.e. the maximum angle through which person 14 can turn his head plus the angle his eyes can see at that head angle. Such a confidence measure can be, for example, a function of camera motion, exposure and focus parameters by which apparatus 22 a/b determines whether the left or right camera 18 or 20 has been stationary for a long enough time to capture a suitable image.

The multiple sensor arrangement shown in FIGS. 1a and 1b has the advantage that cameras 18 and 20 can immediately capture images from the side views. Capturing side view images is typically important because side view images are likely to have been an interesting event that person 14 saw "out of the corner of his eye" to attract his attention and gave rise to head rotation. A camera, e.g. camera 18 or 20, that is already pointing in the correct direction has a high chance of capturing the image that person 14 saw out of the corner of his eye.

Still further, the latter advantage can be further improved by arranging apparatus 22a/b to locally buffer images from each of three cameras 16, 18 and 20, so the image from only one of the cameras is recorded. Control section 22a/b preferably responds to motion detector 10 to capture the buffered images from a time slightly prior to person 14 turning his head to look at the event that gave rise to the head turn. In this way, the event that caused person 14 to turn his head is caught before he actually turned his head to look at the event.

The advantages of the embodiment shown in FIGS. 1a and 1b can be improved by using more than three cameras with overlapping fields of view, such that at least one of the cameras always capture an image having reasonable framing, i.e. the region of interest is in or is close to the center of the frame. If an insufficient number of cameras is used, framing may not be adequate. Also, a sufficiently fast exposure should be used such that images free from motion blur are captured even while the head of person 14 is rotating. In this way, an acceptably cropped still image is obtained by at least one of the frames captured during the head rotation. Alternatively by using three cameras, as shown in FIGS. 1a and 1b, apparatus 22a/b can combine frames from adjacent cameras by using any of the well-known mosaicing techniques to generate an image with an intermediate direction of view, but which is better framed.

Figure 2:
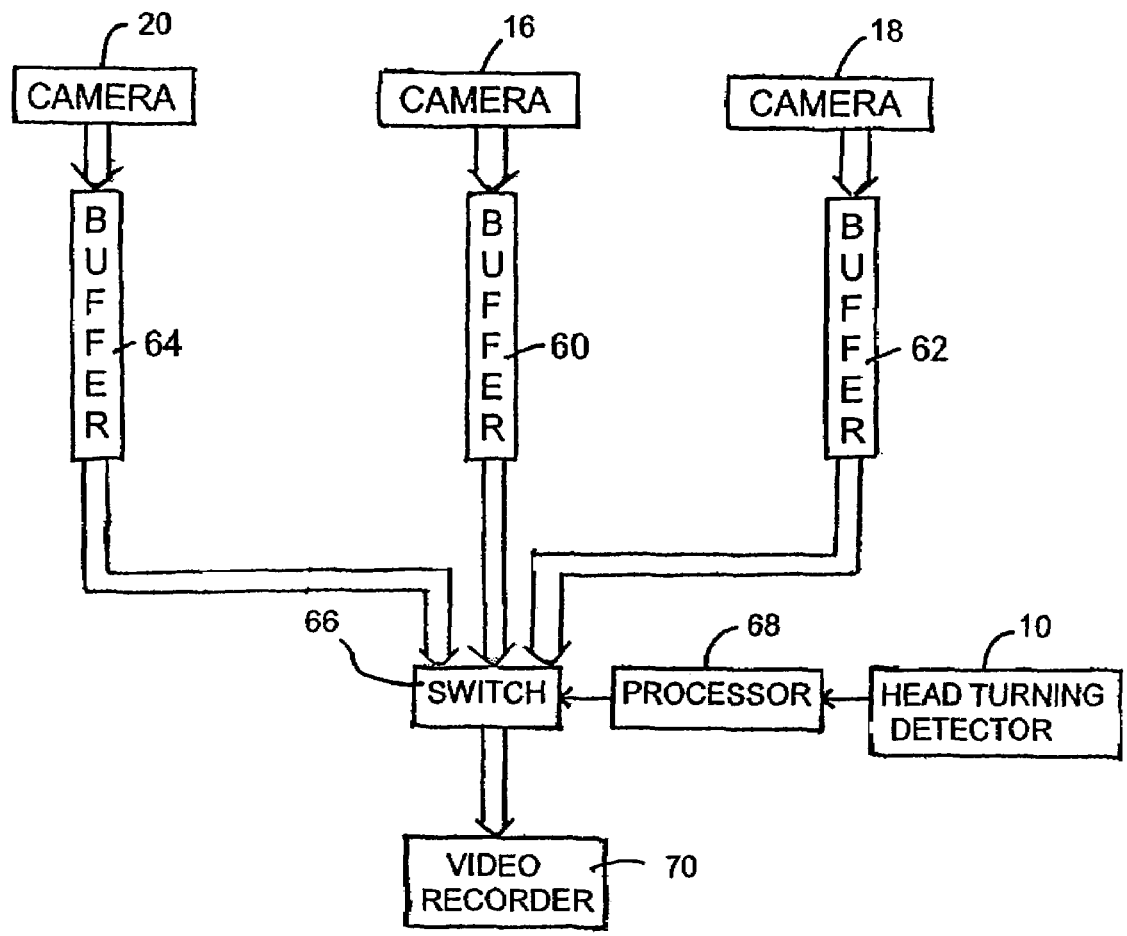
FIG. 2 is a block diagram of electronic circuitry included in the device of FIGS. 1a and 1b.

Reference is now made to FIG. 2 of the drawing, a block diagram of electronic circuitry connected to be responsive to cameras 16, 18 and 20 and included in control apparatus 22a mounted on spectacle 12 or control apparatus 22b carried on the body of person 14. The circuitry of FIG. 2 performs the previously described functions. Cameras 16, 18 and 20 supply sequential image representing signals to dynamic buffers 60, 62 and 64, respectively. Buffers 60, 62 and 64 introduce delays, for example, of approximately half a second, on the image representing signals supplied to them. The buffers supply delayed replicas of the image representing signals to switch 66, controlled by processor 68, in turn connected to be responsive to head turning detector 10.

Processor 68 responds to the output signal of head turning detector 10 to control switch 66 so that the output of one of buffers 60, 62 or 64 is selectively supplied to video recorder 70, preferably of the electronic type. In response to head turning detector 10 indicating that the head of person 14 is looking forward, processor 68 supplies a control signal to switch 66, causing the output of buffer 60 to be applied to video recorder 70. In response to detector 10 indicating that the head of person 14 has turned to the right and the left, detector 10 activates switch 66 to supply the output of the appropriate buffer 62 or 64 to recorder 70.

Processor 68 is arranged so that if head turning detector 10 does not derive a signal indicating that the head of person 14 has returned to the forward direction in a predetermined time after being turned to the left or right, processor 68 activates switch 66 to cause the output of buffer 60 to be supplied to video recorder 70; a typical duration of the predetermined time is two seconds. Because of the delays associated with buffers 60, 62 and 64 and the fact that cameras 16, 18 and 20 are simultaneously responsive to the fields of view to the forward, right and left of the head of person 14, recorder 70 records a substantially faithful replica of the scene seen by the eyes of person 14.

Figure 3A:
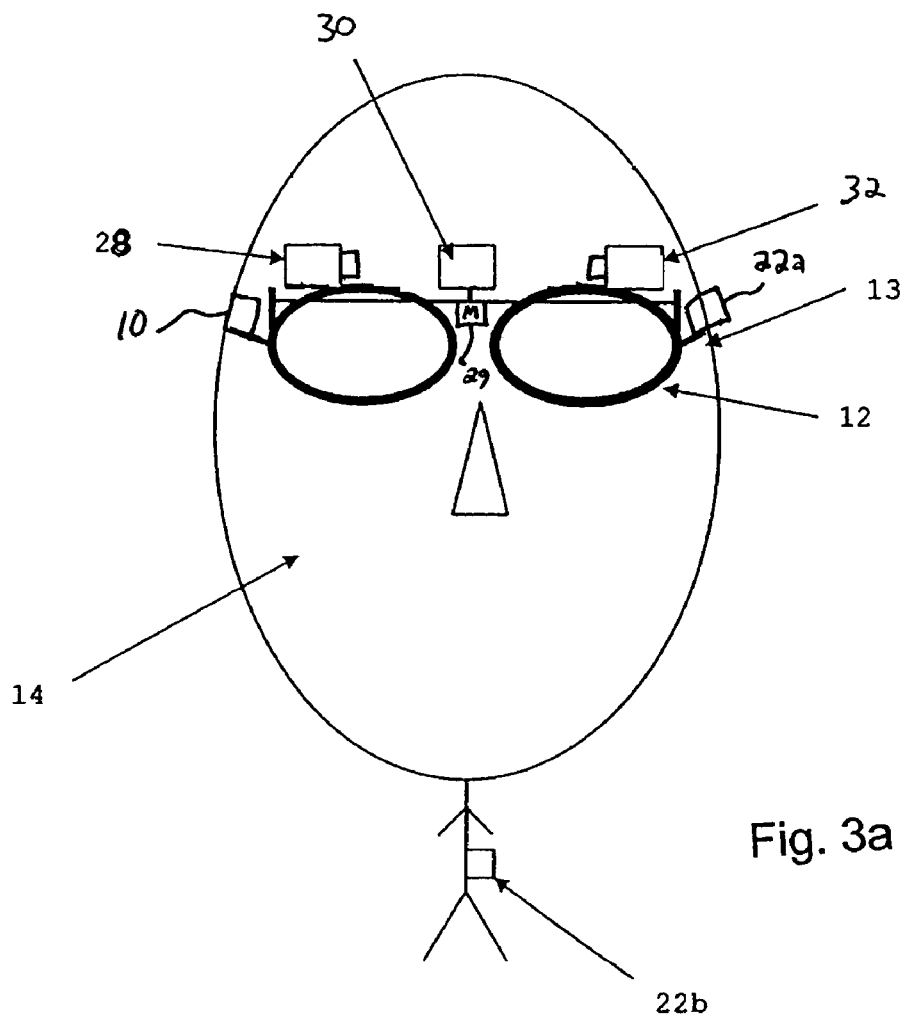
FIG. 3a is a partial schematic front view of an alternative arrangement of an image capture device having a field of view direction that is switched by a pivotable mirror.
Figure 3B:
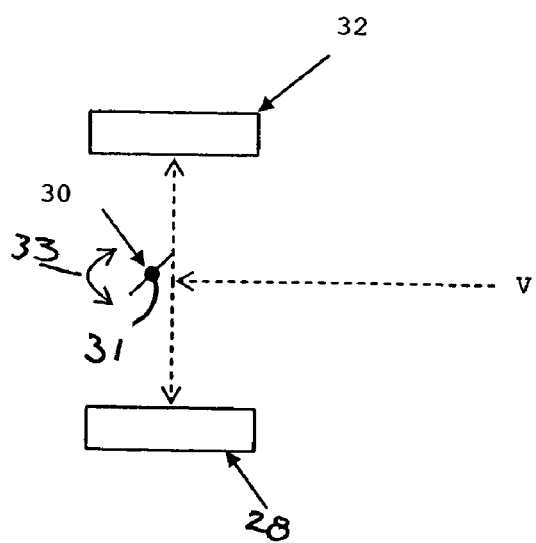

A second embodiment is the system shown in FIGS. 3*a* and 3*b* wherein spectacles 27 that person 14 wears carries first and second fixed cameras 28 and 32, motor 29 and mirror 30. Motor 29 turns mirror 30 about vertical axis 31 in response to the signal from motion detector 10. Mirror 30 enables cameras 28 and 32 to have an optically rotatable or switchable direction of view. Motor 29 turns mirror 30 about axis 31 (as shown by arrows 33) to change the image that is reflected towards cameras 28 and 32 from a view V. Cameras 28 and 32 face towards a centre part of the spectacles shown in FIG. 3*a*.

Mirror 30 is tilted at 45° relative to the forward facing direction of the eyes of person 14 when the head of the person is facing forward in the direction of view V. Thereby, when the head of person 14 is facing forward, the reflecting face of mirror 30 directs image V onto the optical sensor of camera 28 or 32, depending on the direction toward which the person had previously turned his head. In response to detector 10 detecting that the person 14 has turned his head toward the left or the right, the detector causes a processor similar to processor 68 of FIG. 2, to supply a signal to motor 29, causing the motor to turn mirror 30 about axis 31 through a predetermined, additional angle, e.g., 22.5°, from the 45° direction associated with the head of the person facing forward.

For example, in response to mirror 30 being in the position illustrated in FIG. 3*b* and detector 10 detecting head rotation of person 14 to the right (i.e., toward camera 28) motor 29 turns mirror 30 clockwise (as illustrated in FIG. 3*b*) through an angle of 22.5° about axis 31. The reflecting face of mirror 30 is thereby displaced 67.5° from the direction of view V, causing camera 28 to capture the scene that the eyes of person 10 see to the right side of his head. When person 10 turns his head so he is again facing forward or after a predetermined time interval (whichever occurs first), the processor drives mirror 30 back to the 45° position so the reflecting face of the mirror faces camera 28. In response to detector 10 sensing head movement to the left (i.e., towards camera 32), motor 29 turns mirror 30 counterclockwise through an angle of 112.5°, causing camera 32 to capture the scene that the eyes of person 14 see to the left of his head. When person 14 turns his head so he is again facing forward or after a predetermined time interval (whichever occurs first), the processor drives motor 29 to turn mirror 30 back to the 45° position so the reflecting face of the mirror faces camera 32. Mirror 30 stays in this position until detector 10 again detects head turning. Then mirror 30 driven either 22.5° toward camera 32 (for head turning to the left) or 112.5° toward camera 28 (for head turning to the right). It is to be understood that the additional turn angle of mirror 30 can differ from 22.5° and that the mirror can be turned through an angle that is proportional to the angle that the head is turned from the forward direction.

The arrangement described in connection with FIGS. 3*a* and 3*b* has the advantage that the number of components is reduced and fewer image sensors are required. However, there may be some time lag disadvantage with these embodiments, because of the time required to sense the need for movement to one side and the time to achieve movement of mirror 30 and for the need of moving parts.

Figure 4A:
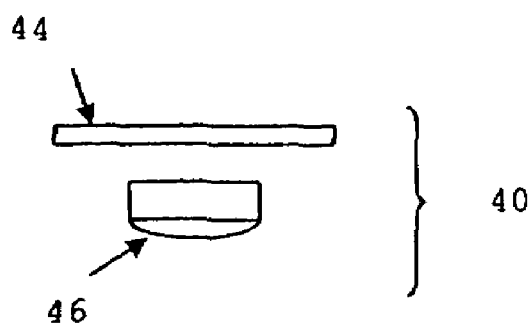
FIG. 4a is a schematic top view of a camera having a fish-eye lens.
Figure 4B:
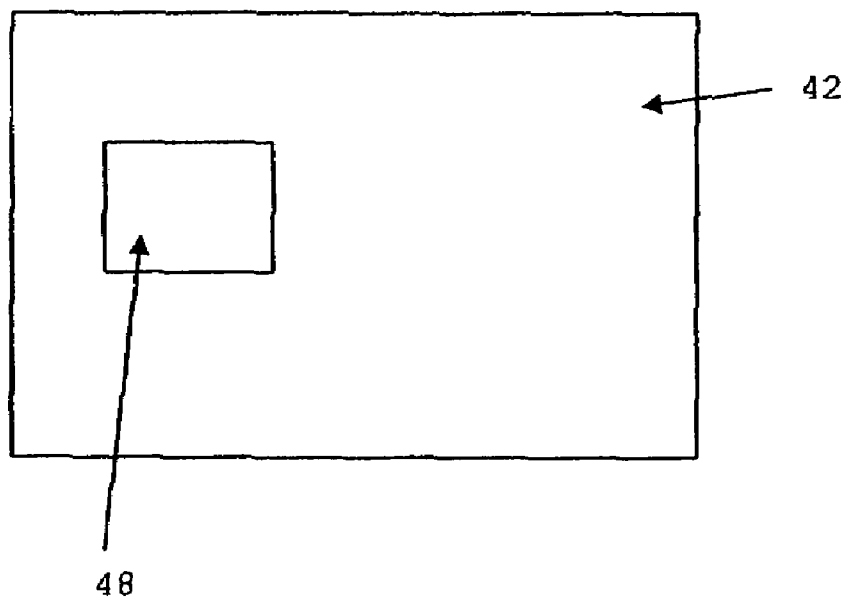

A further alternative for controlling the field of view of the image capture device, is to automatically crop an image from a camera 40 (see FIG. 4*a*) with a very wide field of view 42 (FIG. 4*b*). Camera 40 is worn by person 14 similar to the way person 14 wears camera 16. Camera 40 includes a high resolution sensor 44 and a wide angle lens such as fish-eye lens 46. Apparatus 22*a/b* responds to detector 10 and an up/down head motion detector (not shown) worn on the head of person 14 to capture a portion of field of view 42, i.e., a window of interest 48. Apparatus 22*a/b* records the images in the windows of interest as detected and defined by head motion of person 14 in a manner similar to the way recorder 70 responds to the images of cameras 16, 18 and 20. Apparatus 22*a/b* thereby records window 48 as the window moves across the captured field of image 42 to retain that part of the image which is of interest to person 14.

An advantage of this latter controllable field of view is that there are no moving parts. Good image quality is important at the periphery of image 42 because a portion of the peripheral image becomes the center of a chosen field of interest 48 within the image 42 as the eyes of person 14 look peripherally after head turning.

Figure 5:
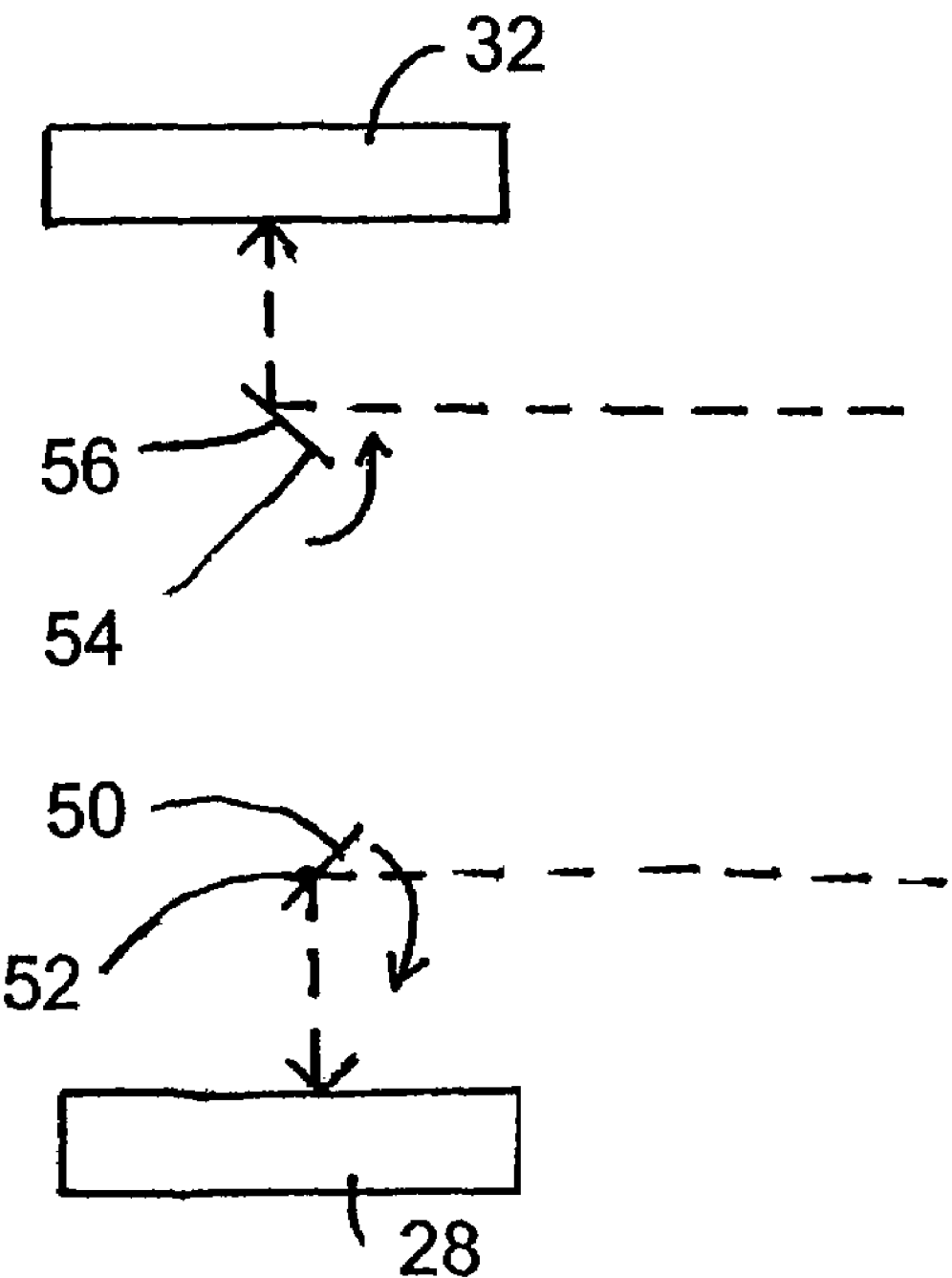
FIG. 5 is a partial schematic front view of an alternative arrangement of an image capture device having a field of view direction that is switched by a pair of pivotable mirrors.

Reference is now made to FIG. 5 of the drawing, a modification of the apparatus illustrated in FIGS. 3*a* and 3*b*. As in the embodiment of FIGS. 3*a* and 3*b*, cameras 28 and 32 are fixedly mounted on spectacles 12 of person 14 and the spectacles carry head rotation detector 10. The optical sensors of cameras 28 and 32 are at right angles to the forward-facing direction of the face of person 14. In the embodiment of FIG. 5, however, mirrors 50 and 54, respectively associated with cameras 28 and 32, are rotatably driven by a motor and gearing arrangement so (not shown) so that mirrors 50 and 54 respectively turn about vertical axes 52 and 56. The motor driving mirrors 50 and 54 is responsive to a processor having an input from head rotation detector 10, in a manner somewhat similar to that described in connection with the way motor 29 turns mirror 30 of FIGS. 3*a* and 3*b*. The processor also responds to detector 10 to control coupling of signals from cameras 28 and 32 to a video recorder, in a manner similar to that previously described in connection with FIG. 2.

When person 14 points his head in the forward direction, mirrors 50 and 54 are driven by the motor and gearing arrangement so that the reflecting faces of the mirrors are inclined at 45° with respect to the optical sensors of cameras 28 and 32 and at 45° with respect to the forward facing direction of the head of person 14. When person 14 moves his head to the right, detector 10 causes a processor similar to processor 68 of FIG. 2, to activate the motor so that the reflecting faces of mirrors 50 and 54 are turned in the clockwise direction (as illustrated in FIG. 5) through a predetermined angle, such as 22.5°. Accordingly, the image on the sensor of camera 28 corresponds with the image seen by the eyes of person 14, as he looks to the right. The processor causes the image detected by the sensor of camera 28 to be coupled through a switch somewhat similar to the switch of FIG. 2, to a video recorder.

In response to person 14 turning his head so it again points forwardly, or after a lapse of a predetermined time interval, such as two seconds (whichever occurs first), the motor and gearing arrangement returns mirrors 50 and 54 to the 45 degree position illustrated in FIG. 5. The switch remains activated so that the image detected by the sensor of camera 28 is coupled to a video recorder, similar to the video recorder of FIG. 2. In response to person 14 turning his head to the left, mirrors 50 and 54 are rotated counterclockwise (as illustrated in FIG. 5) and the switch is activated to couple the image of sensor 32 to the video recorder. In response to person 14 returning his head to the forward facing direction or the predetermined time interval elapsing, the motor and gearing arrangement turns mirrors 50 and 54 in the clockwise direction, while the switch remains energized so that the image from the sensor of camera 32 is coupled to the video recorder.

A more sophisticated embodiment of the systems described above is to detect turning of the head relative to the body, e.g., by including an additional mechanism for detecting rotation of the body of person 14. The body rotation detecting mechanism is preferably the same as that used to detect head rotation, and is secured to the body of person 14 instead of his head. Such an arrangement is disclosed in the co-pending commonly assigned application filed concurrently herewith, entitled IMAGE CAPTURE SYSTEM AND METHOD, Lowe Hauptman Gilman and Berner Docket 1509-455, incorporated herein by reference. With this embodiment an offset view angle is chosen on the basis of the head rotation angle relative to the body rotation angle. This embodiment has the advantage of being a more accurate indicator of when the additional rotation of view should be started and terminated, because it can prevent inappropriate changes to the camera field of view. For example, if person 14 is walking around a corner, he may look straight ahead so no change of the field of view is required. By measuring head rotation relative to body rotation, the walking around a corner situation is differentiated from detecting a head turn alone to signify a change of view.

Another use of the embodiment for detecting head turning relative to body turning is in the case where the head turns initially relative to the body, but the body then turns by a matching amount, so that head and body are facing the same way. The time at which the body "catches up" can signify that the focus of attention has reverted to straight ahead, so the additional rotation of the camera field of view can be terminated when this condition is detected, if it has not been detected earlier.

An option for any of the methods of and apparatuses for capturing images described above is that person makes a final choice of the camera to which apparatus 22a/b responds. Alternatively, a best frame technique can automatically select the angle of view which best frames a probable subject.

While there have been described and illustrated specific embodiments of the invention, it will be clear that variations in the details of the embodiment specifically illustrated and described may be made without departing from the true spirit and scope of the invention as defined in the appended claims. For example, in certain situations, it may be desirable or necessary for images associated with movement of the head of the person to be recorded for head movement in only one direction. In such an instance, one of the side sensors in the embodiments of FIGS. 1, 3 and 5 can be eliminated and the field of view of the wide angle lens of FIG. 4 can be suitably reduced.

The invention claimed is:

1. Apparatus for controlling recording of an image of a scene viewed by a person, said apparatus comprising:
   an optical sensor arrangement for simultaneously deriving image segments corresponding with images of a scene seen by the person looking (a) forward of his head and (b) to at least one side of his head,
   a detector arrangement for controlling which of said image segments is to be recorded dependent on an estimation of the pointing direction of the eyes of the person,
   an image storage for recording only the image segment selected to be recorded by the detector arrangement, without recording the other image segment or segments,
   a buffer memory for temporarily storing plural sequential images from the simultaneously derived image segments corresponding with images of scenes seen by the person looking forward of his head and to at least one side of his head, and
   a switch coupled between said buffer memory and said image storage and controlled by the detector arrangement to output a delayed replica of the image segment, selected to be recorded by the detector arrangement, from said buffer memory to said image storage for recording therein.

2. The apparatus of claim 1 wherein the optical sensor arrangement includes an optical sensor and a reflector arrangement adapted to be turned in response to the control of the detector arrangement.

3. The apparatus of claim 1 wherein the optical sensor arrangement includes (a) a wide-angle lens arranged to have a field of view corresponding with the scene the person sees looking forward of his head and to at least one side of his head, and (b) a processor arrangement for selecting only a portion of the field of view in response to the control of the detector arrangement.

4. The apparatus of claim 1 wherein the detector arrangement includes a detector for rotation of the head of the person and a processor arrangement coupled with the rotation detector for causing a detected image of the optical sensor arrangement to rotate through a greater angle than the rotation of the head of the person.

5. The apparatus of claim 1, wherein
   the optical sensor arrangement includes a wide angle optical sensor from which image segments having different fields of view can be simultaneously derived, the image segments corresponding with images of scenes seen by the person looking forward of his head and to at least one side of his head, and
   the detector arrangement includes a sensor for rotation of the head of the person, for controlling which of said image segments is to be recorded.

6. The apparatus of claim 5 wherein the wide angle optical sensor is arranged to derive several image segments corresponding with images of scenes seen by the person looking forward of his head and to both sides of his head.

7. The apparatus of claim 5 wherein the wide angle optical sensor is adapted to be worn by the person and the detector arrangement includes a processor adapted to be responsive to the sensor for the extent of rotation of the head of the person for controlling which of said image segments is to be recorded.

8. The apparatus of claim 1 wherein the optical sensor arrangement is arranged for simultaneously deriving image segments corresponding with images of scenes seen by the person simultaneously looking to both sides of his head.

9. The apparatus of claim 8 wherein at least a portion of the optical sensor arrangement is adapted to be worn by the person and to turn with turning of the head of the person.

10. The apparatus of claim 8 wherein the optical sensor arrangement includes (a) a wide-angle lens arranged to have a field of view corresponding with the scene the person sees looking forward of his head and to both sides of his head, and (b) a processor arrangement for selecting only a portion of the wide angle lens field of view in response to the control of the detector arrangement.

11. The apparatus of claim 8 wherein the optical sensor arrangement includes plural separate sensors arranged to have different fields of view corresponding approximately with scenes the person sees looking forward and to both sides of his head.

12. The apparatus of claim 11 wherein the plural optical sensors are adapted to be worn by the person and to turn with turning of the head of the person.

13. Apparatus for controlling recording of an image of a scene viewed by a person, the apparatus comprising:
an optical sensor arrangement including plural optical sensors for images corresponding with images of scenes seen by the person looking forward of his head and to at least one side of his head,
a detector arrangement, including a sensor for the rotation of the head of the person, for controlling which of said images is to be recorded,
an image storage for recording only the image selected to be recorded by the detector arrangement, without recording the other image or images,
a buffer memory for temporarily storing plural sequential images from the simultaneously derived image segments corresponding with images of scenes seen by the person looking forward of his head and to at least one side of his head, and
a switch coupled between said buffer memory and said image storage and controlled by the detector arrangement to output a delayed replica of the image segment, selected to be recorded by the detector arrangement, from said buffer memory to said image storage for recording therein.

14. The apparatus of claim 13 wherein the plural optical sensors are arranged to have different, unparallel fields of view and are arranged for simultaneously deriving the images corresponding with the images of scenes seen by the person looking forward of his head and to at least one side of his head.

15. The apparatus of claim 13 wherein the optical sensor arrangement includes several optical sensors arranged to have different, unparallel fields of view for simultaneously deriving several images corresponding with images of scenes seen by the person looking forward of his head and to both sides of his head.

16. The apparatus of claim 13 wherein the plural optical sensors are adapted be worn by the person and to turn with turning of the head of the person.

17. The apparatus of claim 13 wherein the optical sensor arrangement includes first and second turnable reflectors, the plural optical sensors including first and second separate optical sensors respectively associated with the first and second turnable reflectors, the optical sensor arrangement being arranged to be responsive to the detector arrangement and the reflectors being arranged to be turned so that (a) at least one of the optical sensors is arranged to be responsive, via the reflector associated therewith, to images corresponding with images of scenes seen by the person looking forward of his head, (b) the first optical sensor is arranged to be responsive, via the first reflector, to images corresponding with images of scenes seen by the person looking to a first side of his head, and (c) the second optical sensor is arranged to be responsive, via the second reflector, to images of scenes seen corresponding with images seen by the person looking to a second side of his head.

18. The apparatus of claim 13 wherein the optical sensor arrangement includes first and second optical sensors positioned so that they have different, unparallel fields of view so that (a) the first optical sensor is arranged to be responsive to images corresponding with images of scenes seen by the person looking forward of his head, and (b) the second optical sensor is arranged to be responsive to images corresponding with images of scenes seen by the person looking to a first side of his head.

19. The apparatus of claim 13 wherein the optical sensor arrangement includes first, second and third optical sensors positioned so that they have different, unparallel fields of view so that (a) the first optical sensor is arranged to be responsive to images corresponding with images of scenes seen by the person looking forward of his head, (b) the second optical sensor is arranged to be responsive to images corresponding with images of scenes seen by the person looking to a first side of his head, and (c) the third optical sensor is arranged to be responsive to images corresponding with images of scenes seen by the person looking to a second side of his head.

20. The apparatus of claim 13, the optical sensor arrangement including a reflector adapted to be turned in response to rotation of the head, as detected by the detector arrangement.

21. The apparatus of claim 13 wherein the optical sensor arrangement includes a turnable reflector and first and second optical sensors, the optical sensor arrangement being arranged to be responsive to the detector arrangement and the reflector being arranged to be turned so that (a) at least one of the optical sensors is arranged to be responsive, via the reflector, to images corresponding with images of scenes seen by the person looking forward of his head, (b) the first optical sensor is arranged to be responsive, via the reflector, to images corresponding with images of scenes seen by the person looking to a first side of his head, and (c) the second optical sensor is arranged to be responsive, via the reflector, to images corresponding with images of scenes seen by the person looking to a second side of his head.

22. The apparatus of claim 21 wherein the reflector is adapted to be turned toward one of the optical sensors and the forward facing direction of the head of the person while the head is directed forward.

23. A method of recording an image of scenes viewed by a person by using an optical sensor arrangement that simultaneously derives image segments corresponding with images of scenes seen by the person looking (a) forward of his head and (b) to at least one side of his head, said method comprising the steps of:
controlling which of said image segments is to be recorded in response to an estimate of the pointing direction of the eyes of the person; and
recording only the image segment selected in said controlling step, without recording the other image segment or segments;
said method further comprising:
temporarily storing plural sequential images from the simultaneously derived image segments corresponding with images of scenes seen by the person looking forward of his head and to at least one side of his head; and
recording a delayed replica of the image selected to be recorded in the controlling step.

24. The method of claim 23 further including detecting rotation of the head of the person and responding to the detected head rotation by causing a detected image of the optical sensor arrangement to rotate though a greater angle than the rotation of the head of the person.

25. The method of claim 23, wherein the optical sensor arrangement includes a wide angle optical sensor from which image segments having different fields of view can be simultaneously derived, the image segments corresponding with images of scenes seen by the person looking forward of his head and to at least one side of his head, the method comprising selecting one of said images of the sensor in response to rotation of the head of the person, and recording the selected image.

26. The method of claim 23 wherein the optical sensor arrangement includes an optical sensor and a reflector, the method comprising directing images corresponding with images of scenes seen by the person looking forward of his head and to at least one side of his head to the sensor via the reflector by turning the reflector though an angle dependent on the rotation of the head of the person, and recording the image incident on the sensor.

27. The method of claim 23 wherein the optical sensor arrangement simultaneously derives image segments corresponding with images of scenes seen by the person simultaneously looking to both sides of his head and the recording step records only one of said images.

28. The method of claim 27 wherein the optical sensor arrangement includes plural separate sensors having different, unparallel fields of view corresponding approximately with scenes seen by the person looking forward and to both sides of his head.

29. The method of claim 28 wherein the optical sensor arrangement includes a wide-angle lens having a field of view corresponding with scenes seen by the person looking forward of his head and to both sides of his head, the method comprising selecting only a portion of the wide angle lens field of view in response to the control of the detector arrangement.

30. Apparatus for controlling recording of an image of a scene viewed by a person, the apparatus comprising:

an optical sensor arrangement including plural optical sensors for images corresponding with images of scenes seen by the person looking forward of his head and to at least one side of his head; and a detector arrangement, including a sensor for the rotation of the head of the person, for controlling which of said images is to be recorded;

wherein the detector arrangement is configured to select, for recording by the image storage, a first image corresponding to the scene seen by the person looking forward of his head until the sensor detects a rotation of the head of the person to said at least one side of the head, to select, in response to said sensor's detection of the rotation of the head to said at least one side, a second image corresponding to the scene seen by the person looking to said at least one side of his head for recording by the image storage, and to re-select the first image for recording by the image storage when the sensor does not detect a return rotation of the head of the person from said at least one side to the forward looking direction within a predetermined time period.

31. A method of recording an image of a scene viewed by a person by using an optical sensor arrangement including plural optical sensors for images corresponding with images seen by the person looking forward of his head and to at least one side of his head, the method comprising:

selecting one of said images of the sensor arrangement in response to rotation of the head of the person, and recording only the selected image;

switching from selecting and recording a first image corresponding with the scene seen by the person looking in a first direction, to selecting and recording a second image corresponding with the scene seen by the person looking in a second, different direction, upon detecting a rotation of the head of the person from the first direction to the second direction; and automatically switching back to select and record the first image when a return rotation of the head of the person from the second direction to the first direction is not detected within a predetermined time period.

* * * * *